May 10, 1966 W. F. HOWELER 3,250,102
ROTARY SCORING DEVICE FOR CONTINUOUS TUBE WELDING MACHINE
Filed Sept. 6, 1963
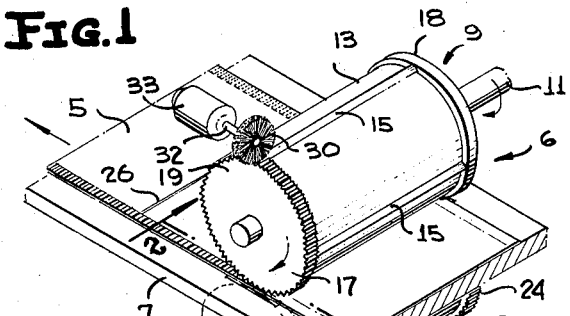
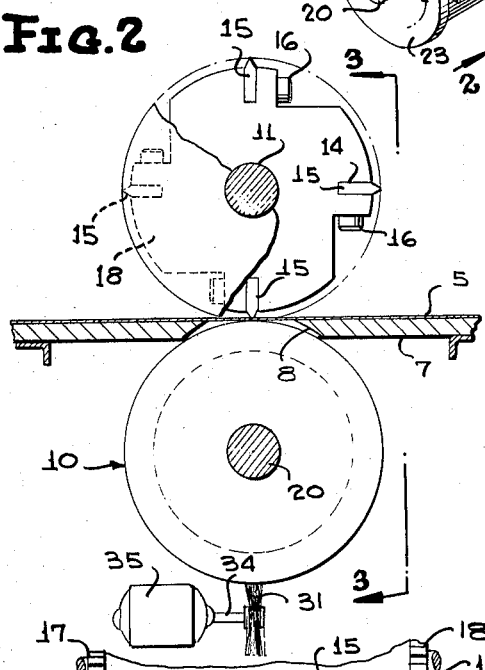
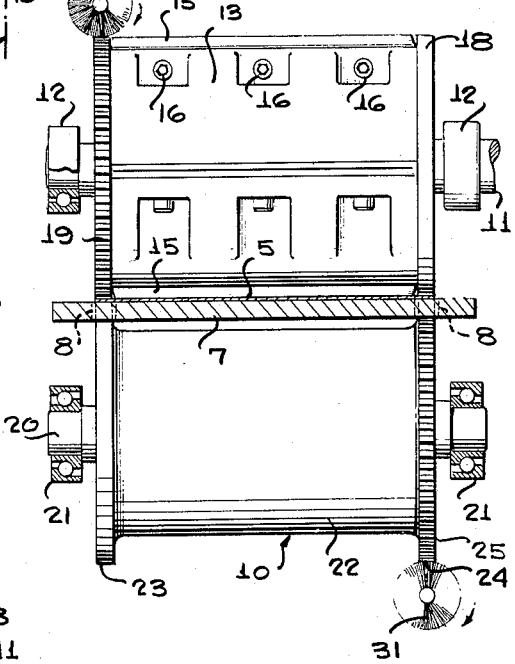
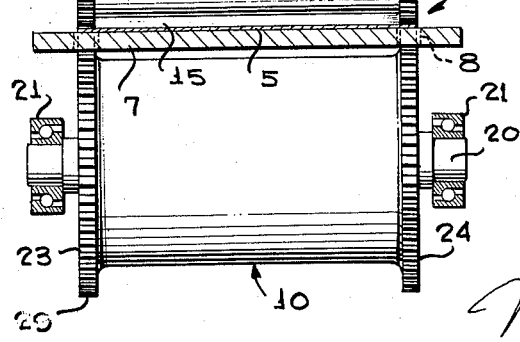
INVENTOR
WARREN F. HOWELER
BY
ATTORNEYS United States Patent Office 3,250,102
Patented May 10, 1966

3,250,102
ROTARY SCORING DEVICE FOR CONTINUOUS TUBE WELDING MACHINE
Warren F. Howeler, Oak Lawn, Ill., assignor to Continental Can Company, Inc., New York, N.Y., a corporation of New York
Filed Sept. 6, 1963, Ser. No. 307,113
7 Claims. (Cl. 72—40)

This invention relates in general to new and useful improvements in the metal working art, and more particularly to a novel rotary scoring device for use in conjunction with strips which are continuously welded into tubes.

The customary manner of making can bodies and like tubular elements of thin sheet metal in the past has been to provide a generally rectangular blank which is suitably trimmed and flanged, after which the blank is shaped into a tubular form and the flanges hooked together to form a seam. Other can bodies and like tubular elements have been formed with a simple lap seam wherein the overlapped portions of the tubular body are secured together either by solder or a suitable adhesive. However, recent developments in the field of high frequency heating and welding have made it feasible to continuously weld a tube from thin gauge metal of the gauges suitable for can manufacture. This invention has to do with the preparation of the metal strips prior to the shaping thereof into tubular form and the welding of a seam between the edges of the strip.

In order to conveniently separate a continuously welded tube into predetermined lengths, it has been found desirable to initially score the strip. It is obvious that such scoring must be accomplished at a very high rate in order to be feasible. It is also apparent that it is highly desirable to be able to score the strip as it is fed from a coil to the tube forming and welding apparatus. However, particularly when can bodies are to be formed from the tubing, the scoring must be very accurate. If the strip is not accurately scored at spaced intervals, then the resultant can bodies will not be within the necessary tolerances as to height and capacity and the resultant can bodies will be of no value. Also, it is desirable in many instances to prior lithograph the strip and should there be any relative creep between the printing operation and the scoring operation, although the differential may be extremely small, when can bodies are produced at the rate of a thousand can bodies per minute or higher, it will be apparent that any minute creep would result in a miscentering of the score line with respect to the lithography.

In view of the foregoing, it is the primary object of this invention to provide novel strip scoring means wherein there is no slip between the scoring means and the strip being scored so that all score lines formed on the strip are spaced equi-distant.

Another object of this invention is to provide a novel scoring device for scoring a continuous metal strip wherein the scoring device is of a construction suitable for placement in a tube welding line intermediate the coil of metal strip and the tube forming apparatus of the welding line wherein the strip may be scored as a part of the continuous tube forming and welding operation.

Another object of this invention is to provide a novel rotary scoring device which includes a pair of rolls or drums of a cooperating construction and wherein edge portions of the rolls are selectively knurled or embossed to have a biting engagement with edge portions of a strip being scored wherein relative slipping movement between the scoring rolls and the strip being scored is prevented.

Another object of this invention is to provide a novel rotary scoring device which includes a pair of rolls or drums of a cooperating construction and wherein edge portions of the rolls are selectively knurled or embossed to have a biting engagement with edge portions of a strip being scored whereby the scoring rolls may be driven by the movement of the strip therebetween so that external power for driving the scoring rolls is not required.

In the welding of certain metals, particularly aluminum and aluminum alloys, the existence of oxide coatings in the weld area presents problems in the forming of the desired weld. Accordingly, in many instances, special means are provided in welding lines to remove such oxide coatings immediately prior to the welding operation.

In accordance with this invention, it is further an object to provide a novel rotary scoring device which includes a pair of cooperating scoring rolls having edge portions which are in driving engagement with edge portions of a strip being scored, and the construction of the edge portions of the scoring rolls being of a nature whereby a biting engagement with the strip results, and the surface oxide coatings of the edge portions of the strip are partially removed and sufficiently disturbed for good welding automatically during the scoring operation.

It is a further object of this invention to provide a novel method of scoring a moving strip wherein scoring rolls are utilized and the scoring rolls are driven from the moving strip by the movement thereof through the scoring rolls.

A still further object of this invention is to provide a novel method of scoring a strip at accurately spaced intervals, the method utilizing scoring rolls having end or edge portions which are knurled or otherwise embossed to have a biting engagement with the strip being scored whereby slippage of the strip relative to the scoring rolls is prevented to thus provide an accurate scoring, and at the same time the movement of the strip through the scoring rolls results in the breaking up and partial removal of surface oxide coatings from those portions of the strip which are brought into engagement during the welding of a tube from the strip.

Still another object of this invention is to provide a novel apparatus for accurately scoring a strip at spaced intervals, the apparatus including scoring rolls having knurled edge portions which simultaneously serve to prevent slippage of a strip being scored relative to the scoring rolls and to loosen surface oxide coatings of the edge portions of the strip, the apparatus further including brushes engageable with the knurled scoring roll portions for the purpose of removing oxide deposits from the knurling.

With the above and other objects in view that will hereinafter appear, the nature of the invention will be more clearly understood by reference to the following detailed description, the appended claims and the several views illustrated in the accompanying drawing.

In the drawing:
FIGURE 1 is a perspective view of a rotary scoring device formed in accordance with this invention and shows the same in operation on a moving strip.

FIGURE 2 is an enlarged fragmentary sectional view taken longitudinally of the strip along the line 2—2 of FIGURE 1 and shows further the details of the scoring device.

FIGURE 3 is an enlarged fragmentary vertical sectional view taken transversely of the strip along the line 3—3 of FIGURE 2 and shows additional details of the rotary scoring device.

FIGURE 4 is a fragmentary vertical sectional view similar to FIGURE 3 and shows a modified form of scoring roll construction.

Referring now to the drawings in detail, it will be seen that there is illustrated a strip 5 which is to be scored at regular intervals. The strip 5 is illustrated as passing through a scoring device of the rotary type, the scoring device being generally referred to by the numeral 6. The scoring device 6 includes a flat wear plate 7 over which the strip 5 passes. As is clearly illustrated in FIGURES 2 and 3, the wear plate 7 is interrupted by two longitudinally extending openings 8 formed upwardly through the underside thereof for a purpose to be described in detail hereinafter.

The scoring device 6 also includes a pair of cooperating rolls or drums. The upper one of the rolls or drums is generally referred to by the numeral 9 while the lower one of the rolls or drums is generally referred to by the numeral 10. The upper roll 9 may be considered the scoring roll while the lower roll 10 may be considered a backup roll.

The upper roll or drum includes a shaft 11 which is suitably journalled for rotation in bearings 12 and which is disposed a predetermined distance above the surface of the wear plate 7. The shaft 11 carries a housing 13 and has a plurality of circumferentially spaced, radially extending sockets 14 therein in which there are clamped scoring blades 15 by means of set screws 16. It is to be understood that the scoring blades 15 are spaced equidistant about the housing 13 so that all scores made in the strip 5 will be spaced equi-distant.

The ends of the housing 13 are slightly enlarged to define a pair of wheels 17 and 18. In the scoring device 6, the peripheral surface of the wheel 17 is provided with knurling 19 to effect a biting engagement with the upper surface of an edge portion of the strip 5 for a purpose to be described hereinafter.

The roll 10 is of a light-weight construction as compared to the roll 9, and if desired, may be hollow. The roll 10 includes a shaft 20 which is suitably journalled in bearings 21. A housing 22 is carried by the shaft 20 and the housing 22 terminates at its ends in enlarged wheels 23 and 24. The wheel 23 opposes the wheel 17 and is smooth while the wheel 24, which opposes the wheel 18, is provided with peripheral knurling or other type of embossing 25.

It will be seen that as the strip 5 is fed between the rolls 9 and 10, it slides along the wear plate 7. The housing 22 of the roll 10 is configured to be spaced from the wear plate 7 at all times. On the other hand, the wheels 23 and 24 of the roll 10 project up through the openings 8, which are contoured to closely receive the wheels 23 and 24 and have their upper surfaces disposed substantially co-planar with the upper surface of the wear plate 7. The relationship of the rolls 9 and 10 is such that the edge portions of the strip 5 being scored are firmly gripped between the wheels 17 and 23 along one edge and the wheels 18 and 24 along the other edge. The scoring blades 15 cooperate with the upper surface of the wear plate 7 to effect the scoring of the strip 5. At this time it is pointed out that although the scoring blades or knives 15 have been illustrated as being provided with straight edges, it is to be understood that the scoring blades 15 may be provided with contoured edges to provide a score line which varies in depth throughout the length thereof. The strip 5 is illustrated as having a conventional score line 26 formed therein.

The biting engagement of the wheels 17 and 24 with the edge portions of the strip 5 has a two-fold advantage. In the first place, the gripping or biting engagement of the edge portions of the strip by the wheels 17 and 24 prevents any slippage between the strip 5 and the scoring roll 9. Secondly, while it is customary to drive the scoring rolls by means of an outside source, the scoring device 6 may be driven by the moving strip 5 in lieu of the strip 5 being driven by the scoring device 6. It is to be understood that if the strip 5 is pulled through the scoring device 6, the biting engagement of the wheels 17 and 24 with the edge portions of the strip 5 will result in the driving of the scoring rolls 9 and 10. However, it is also to be understood that the shaft 11 of the scoring roll 9 may be driven if it is so desired.

The second advantage of the biting engagement of the wheels 17 and 24 with the edge portions of the strip 5 is that when certain metals are being welded, it is desirable that surface oxides be removed from the weld areas. The biting engagement of the wheels 17 and 24 with the surfaces of the strip 5 along the edge portions thereof results in the breaking up and partial removal of the surface oxides. This is particularly beneficial when aluminum or aluminum alloys are welded. It is to be noted that with the scoring device 6, only those surfaces of the strip 5 which are definitely intended to come into contact during a welding operation are engaged by the wheels 17 and 24.

In FIGURE 4 there is illustrated a modified form of scoring device, generally referred to by the numeral 27. The scoring device 27 is almost identical with the scoring device 6 and differs therefrom only in that the wheels 18 and 23, in lieu of being smooth, are provided with peripheral knurlings 28 and 29, respectively. This knurling of the peripheral surfaces of the wheels 18 and 23 provides for both a better gripping of the strip 5 being scored to further reduce any possibility of relative slippage between the strip 5 and the scoring roll 9, and the edge portions of the strip 5 have surface oxides broke off and removed from both the upper and lower surfaces thereof. Only two of the four edge portion surfaces of the strip 5 come into contact during a lap welding operation or a modified lap welding operation. It will be apparent that by removing the surface oxide coatings from all four edge portion surface areas, the engagement of the proper clean surfaces at the time of welding is assured.

Referring once again to FIGURES 1, 2 and 3, it will be seen that the wheels 17 and 24 have associated therewith rotary brushes 30 and 31, respectively. The rotary brush 30 is carried by a main shaft 32 of a small electric or fluid motor 33. The brush 31, as is best shown in FIGURE 2, is carried by a main shaft 34 of a small electric or fluid motor 35. The motors 33 and 35 will be suitably mounted in fixed relation with respect to the scoring rolls 9 and 10 in any desired conventional manner.

Reference is now made to FIGURE 3 in particular wherein it will be seen that the brush 30 rotates in a clockwise direction so that as it engages the knurling 19 it will brush any foreign matter deposited within the knurling 19 endwise of the scoring roll 9 and away therefrom. The brush 31 is also driven in a clockwise direction, as viewed in FIGURE 3, so that as it engages the knurling 25, it will brush any foreign matter deposited within the knurling 25 longitudinally of the scoring roll 10 and away therefrom.

It will be readily apparent that during the operation of the rolls 9 and 10, as oxide is loosened and partially removed by the knurlings 19 and 25, a certain amount of this oxide will be deposited within the knurlings 19 and 25. The brushes 30 and 31 will assure the proper cleaning of the knurlings 19 and 25.

Although the brushes 30 and 31 have been illustrated only with respect to the scoring device 6, it is to be understood that similar brushes may be incorporated in the scoring device 27. In this event, each of the wheels 17, 18, 23 and 24 would have associated with the knurling thereof a brush similar to the brushes 30 and 31.

The advantages of the rotary scoring devices specifically set forth above are believed to be obvious. It is apparent that the scoring devices may be readily incorporated in existing welding lines to both assure the scoring of the strip being welded at controlled spaced intervals, and that surface oxides will be removed from those surface areas of the strip which are brought into contact during the welding operation.

Although only two preferred embodiments of the invention have been specifically illustrated and described herein, it is to be understood that minor variations may be made in the disclosed scoring devices within the spirit

I claim:

1. A method of conditioning a moving metal strip having opposite longitudinal edges and opposite upper and lower surfaces by utilizing a plurality of cooperating rolls comprising the steps of passing longitudinal edge portions of the strip between the plurality of rolls in continuous interlocking engagement therewith to assure a positive strip feed relation between the strip and the rolls and simultaneously utilizing the rolls to at least partially remove oxide from the upper surface of the strip adjacent one of the longitudinal edges and the lower surface of the strip adjacent the other of the longitudinal edges, removing oxide from selected ones of the rolls transferred thereto during the passage of the strip through the rolls, and intermittently scoring said strip generally transverse to the longitudinal axis of the strip.

2. A rotary scoring device comprising a pair of cooperating rolls having end portions for gripping strip edge portions in driving relation, one of said rolls having at least one scoring blade carried thereby for intermittently scoring said strip, at least one roll end portion of each of the pair of rolls having configurated surfaces defining means for a continuous and positive interlock between only edge portions of the strip and said rolls.

3. The scoring device of claim 2 wherein said configurated surfaces provide the sole driving means for said rolls.

4. The scoring device of claim 2 wherein the other of said rolls is recessed intermediate said end portions, and a wear plate cooperates with said blade to back up the strip, said wear plate being seated in said roll recess.

5. The scoring device of claim 2 wherein said configurated surfaces are of a configuration to effect a breaking up and partial removal of any oxide that may exist along selected edge portions of the strip.

6. The scoring device of claim 2 wherein said configurated surfaces are of a configuration to effect a breaking up and partial removal of any oxide that may exist along selected edge portions of the strip, the other of said rolls is recessed intermediate said end portions, and a wear plate cooperates with said blade to back up the strip, said wear plate being seated in said roll recess.

7. The scoring device as defined in claim 5 including means for removing oxide from at least one of said surfaces.

References Cited by the Examiner

UNITED STATES PATENTS

| | | | |
|---|---|---|---|
| 807,420 | 12/1905 | Copland | 83—6 |
| 1,785,905 | 12/1930 | Kerrvish | 80—5.1 |
| 1,883,080 | 10/1932 | Stull | 80—5.1 |
| 1,959,851 | 5/1934 | Biggert | 80—3 |
| 1,965,276 | 7/1934 | Barghausen | 101—24 |
| 2,222,842 | 11/1940 | Humphrey | 83—10 |
| 2,549,466 | 4/1951 | Hoheisel | 80—5.1 |
| 2,639,660 | 5/1953 | Sunderhauf | 72—167 |
| 2,716,940 | 9/1955 | Kemper | 80—5.1 |
| 2,748,922 | 6/1956 | Shidler | 80—5.1 |
| 3,015,603 | 1/1962 | Hawley | 83—6 |

RICHARD J. HERBST, *Primary Examiner.*

CHARLES W. LANHAM, H. D. HOINKES, *Examiners.*